UNITED STATES PATENT OFFICE.

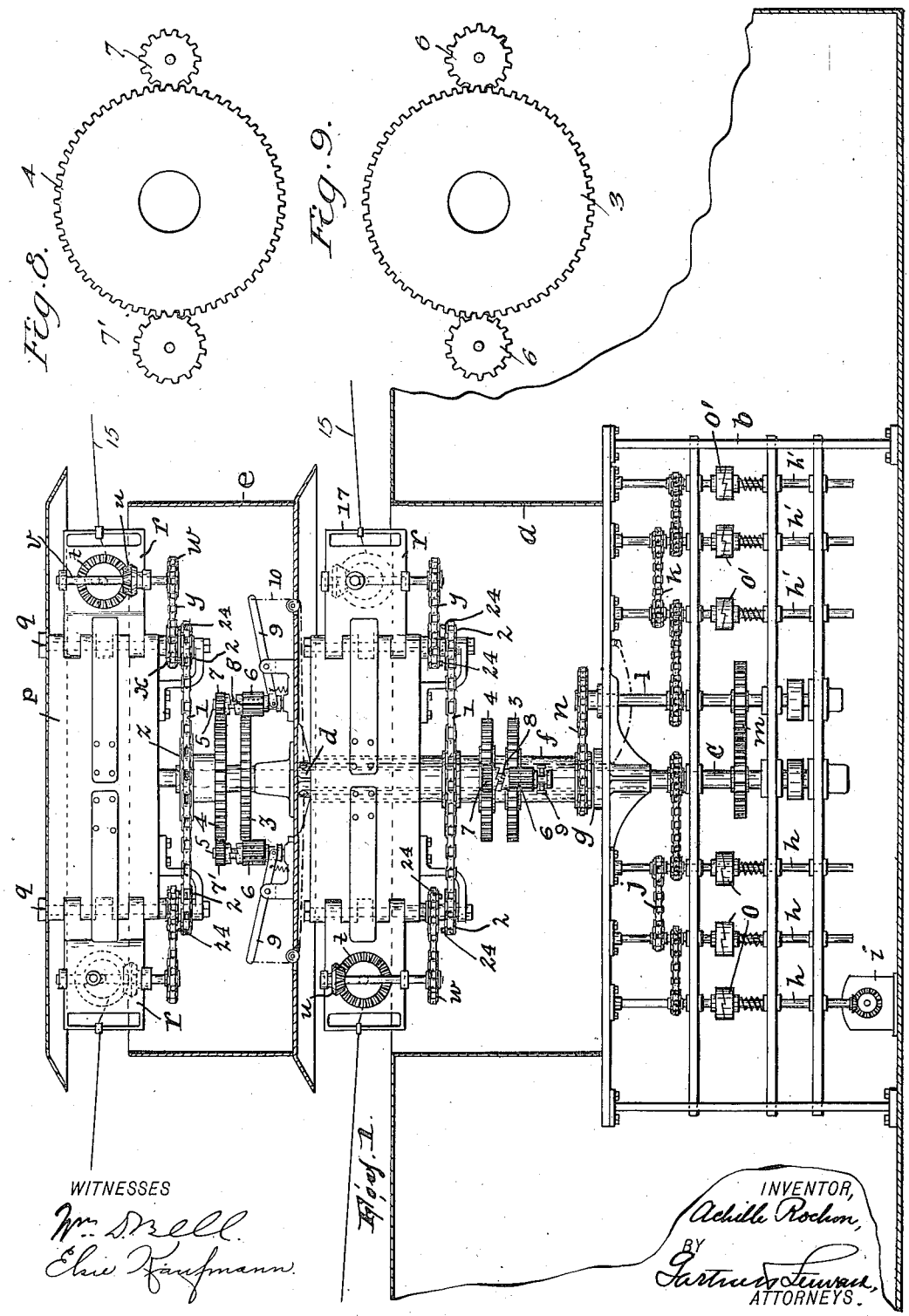

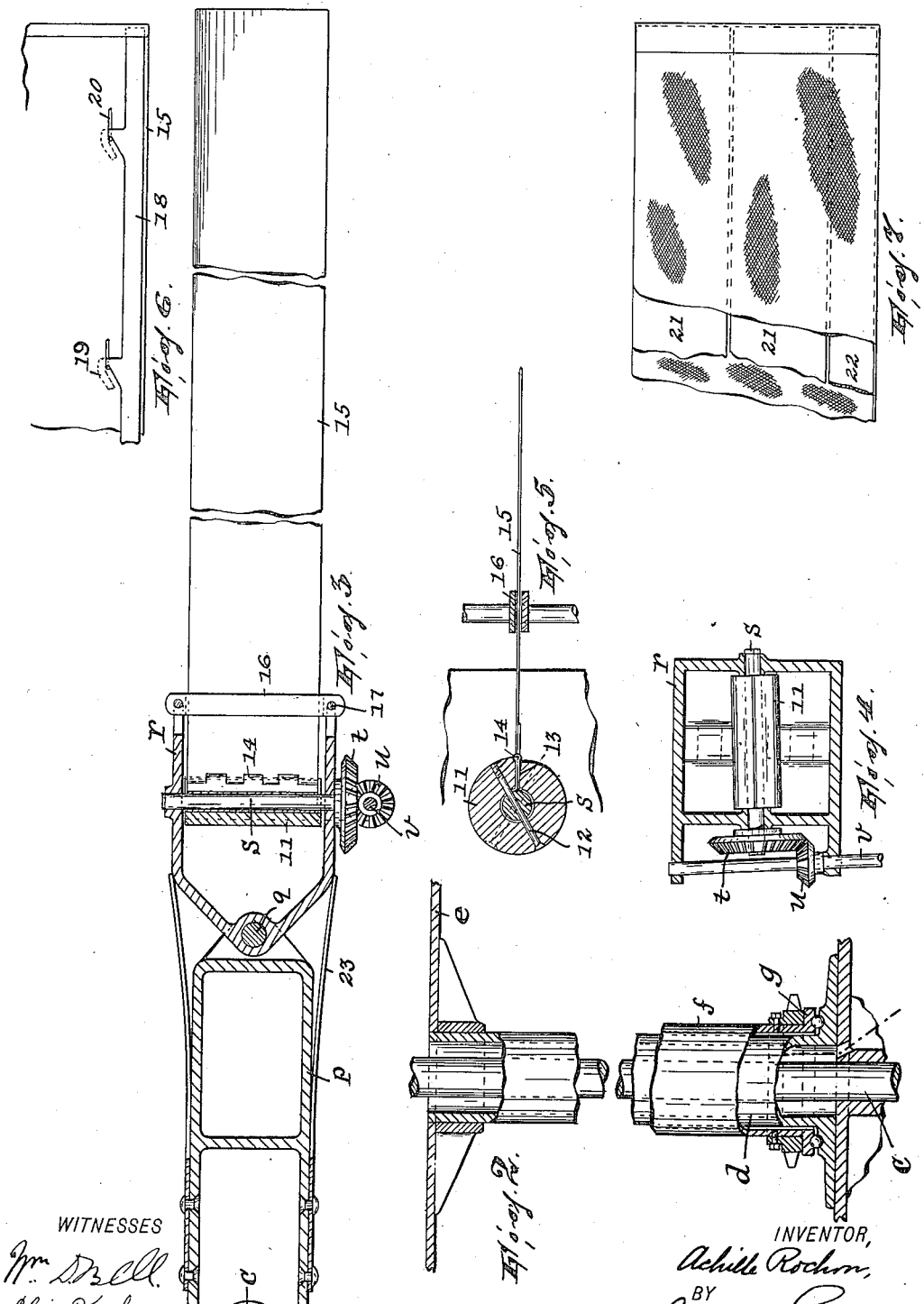

ACHILLE ROCHON, OF PATERSON, NEW JERSEY.

FLYING-MACHINE.

1,145,388.	Specification of Letters Patent.	Patented July 6, 1915.

Application filed October 14, 1907. Serial No. 397,335.

*To all whom it may concern:*

Be it known that I, ACHILLE ROCHON, a citizen of the United States, residing in Paterson, Passaic county, New Jersey, have invented a certain new and useful Improvement in Flying-Machines; and I do hereby declare the following to be a full, clear, and exact description of the invention, such as will enable others skilled in the art to which it appertains to make and use the same, reference being had to the accompanying drawings and to letters of reference marked thereon, which form a part of this specification.

My present invention relates to machines for accomplishing aerial flight and it consists in certain improvements therein, hereinafter particularly described with reference to an adaptation hereby shown in the accompanying drawings, and finally embodied in the clauses of the claims, whereby it is possible to attain various elevations, given a suitable motive source, by effecting certain control and coöperation of the parts of the apparatus as the same are affected by certain physical laws, such as centrifugal force, gravity, the action of inclined planes on the air, etc.

In said drawings, Figure 1 is a view partly in vertical section and partly in elevation of the machine; Fig. 2 is a view partly in section and partly in elevation of the main drive shafts and other parts with respect to which they rotate; Fig. 3 is a horizontal sectional view through a part of the mechanism controlling the wings of the machine; Fig. 4 is a vertical sectional view of what is shown in Fig. 3 taken in the plane of the axes of certain beveled gearing; Figs. 5, 6 and 7 are details of what is shown in Figs. 3 and 4, Figs. 6 and 7 being views illustrating different types of the blades or wings. Figs. 8 and 9 are horizontal sectional views of gears 7′, 4 and 7 and of gears 6, 3 and 6, showing the number of teeth in each gear.

The body of the machine $a$ may be of any suitable form to adapt it to carry the person operating the machine and others, and in this is arranged a framing $b$ in which is stepped a shaft $c$, which is one of the two main drive shafts. The top of this framing supports a fixed pillar $d$ through which shaft $c$ projects upwardly and which carries a hollow casing $e$, which is non-rotary, the same as is the pillar.

$f$ is a hollow shaft surrounding the pillar and stepped on a suitable anti-frictional bearing $g$.

$h$ $h'$ designate two series of shafts each of which may be connected with a source of motive power $i$ to be driven thereby. One series of these shafts is connected by sprocket and chain connections $j$ with shaft $c$, the other series ($h'$) is connected by sprocket and chain connections $k$ with a countershaft $l$ which is connected by the gearing $m$ with shaft $c$ and by the sprocket and chain connection $n$ with shaft $f$. The two series of shafts $h$ $h'$ coöperate in driving the shafts $c$ and $f$, which, owing to the gearing $m$, rotate in reverse directions. The shafts $h$ $h'$ are provided with clutches $o$ $o'$ so that, should any one of the several motors $i$ cease to operate, the particular shaft $h$ $h'$ which it drives will not interfere with the action of any of the other shafts $h$ $h'$.

Each shaft $c$ and $f$ carries what I term a helicopter, the one being arranged above the other. Merely observing that these helicopters rotate in reverse directions, the same as the shafts $c$ and $f$ which carry them, I shall let the following description of the upper one of them suffice for both, since, except in certain particulars which will be mentioned, they are exactly similar. Fixed to rotate with the shaft $c$ is the head $p$ to which are pivoted on the vertical parallel axes $q$ the housings $r$; in each housing is journaled a shaft $s$, the two shafts being inclined from the horizontal reversely to each other. On one end of one of the shafts $s$ and the relatively opposite end of the other shaft $s$ is a beveled pinion $t$, and meshing with this pinion, on the lower side of its axis, is a beveled pinion $u$ fixed on an upright shaft $v$ journaled in the housing. Each of the shafts $v$ carries a sprocket $w$ over which and a sprocket $x$, running freely on axis $q$, extends a chain $y$. Rotating freely on shaft $c$ is a sprocket $z$ with which engages an endless chain 1 which also engages a sprocket 2 fixed to rotate with sprocket $x$. Fixed on shaft $c$ is a gear 3, while fixed to rotate with sprocket $z$ is a gear 4 of the same size and number of teeth as gear 3, but rotating independently thereof. The casing $e$ supports two vertical shafts 5 and on these are arranged the pinions 6, having a similar number of teeth and meshing with gear 3, and the pinions 7 7′ meshing with gear 4 and one (say 7) having a less number of teeth than the pinion 6 and the other (7') a correspondingly greater number of teeth than said pinion 6. Each two pinions 6 and 7, and 6 and 7' are adapted to be disconnectively connected with each other by the clutches 8 whenever the corresponding pinion 6 is slid vertically on the shaft 5 by the controlling fork 9, each such fork having a suitable flexible device 10 for operating it, and such device extending down into convenient reach of the operator.

It will be understood that the pinions 7 and 7', having different numbers of teeth on the same diameter, do not mesh correctly with gear 4. If a perfect gearing is desired, wheel 4 should bear two rows of teeth on diameters calculated to correspond with different diameters for the pinions 7 and 7'. The connection of pinions 6 and 7' while 6 and 7 are disconnected prevents the free rotation of gear 4 and the uncontrolled unrolling of the blades, but 7' having more teeth than 6 allows said gear 4 to turn faster than shaft $c$ and lets the blades unroll at a regulated speed. The connection of 6 and 7 makes gear 4 turn slower than shaft $c$ and forces the drums to turn so as to roll the blades.

The housings $r$ are adapted to contain the flexible blades or wings which roll up on the shafts $s$ and which, owing to the aforementioned inclination of said shafts form parts of a helix when said blades or wings are more or less extended. To this end, a drum 11 is secured, by means of a pin 12, in fixed relation to each shaft $s$ and securely grips a metallic strip 13 which projects from the drum and forms at 14 a hinge for the wing or blade 15; this gives the wing or blade articulation on an axis substantially parallel with the shafts $s$, for a purpose to appear later. To insure the proper disposition of the wing or blade in the housings and its proper action in winding and unwinding, it is extended through a guide 16 which may move vertically on the parts 17 of the housing. In order to produce the proper action of such blade on the air, the front or higher edge portion of the blade is formed heavier than the remaining portion thereof, either by thickness, or by one or several superposed strips of sheet metal or other material 18, detachably secured to the blade or wing by the hooks 19, entering slits 20 in the wing as shown in Fig. 6, or as shown in Fig. 7 by strips 21 of sheet metal or other material, or otherwise. If it should be found advantageous to augment the weight of the blades for augmenting their centrifugal force proportionally to their area, it will be understood that, in order to retain their pliability, they should be composed of several thin superposed sheets.

23 designates plate springs secured to the opposite sides of the head $p$ and overlapping the housings $r$; so that they form yielding abutments for the housings as the same move on their axes $q$.

It should be remarked that the sprocket $x$ and the sprocket 2 are not rigidly connected to each other but, by virtue of the abutments 24 thereon, the sprocket $x$ is allowed some lost motion relatively to sprocket 2 so that each wing or blade is thus allowed some free play backward and forward with its housing irrespective of the other.

The two helicopters are substantially alike in all the details above set forth except that in the case of the lower one the various parts rotate in a direction opposite to the corresponding parts of the upper one, and for this reason their clutches 8 are formed reversely to the clutches 8 for the upper helicopters and the beveled pinions upper helicopters and the beveled pinions $u$ mesh with the upper pinions $t$ above the shafts $s$ of the latter, instead of below them, as in the case of the upper helicopter.

It will be understood that I am not limited to any of the details of construction of the specific forms of gearing and other parts shown in the drawings.

Having thus fully described my invention, what I claim and desire to secure by Letters Patent is:

1. In a flying machine, the combination with an expansible blade, of means for controlling its expansion by centrifugal action, while in rotation.

2. In a propelling mechanism, in combination, a rotatable member, means for rotating the same, and a plurality of blades hinged to said rotatable member by means of two hinges at an angle to each other, whereby said blades may yield beyond the plane of rotation of their hinges when in rotation.

3. In a propelling mechanism, in combination, a rotatable member, means for rotating the same, and a plurality of blades hinged to said rotatable member by means of two hinges at an angle to each other, whereby said blades may yield beyond the plane of rotation of their hinges and backward relatively to the rotatable member when rotated thereby.

4. In a propelling mechanism, a rotatable member, means for rotating the same, and a plurality of blades having their forward portion the heaviest part thereof, hinged to said rotatable member by means of two hinges at an angle to each other, whereby said blades may yield beyond the plane of rotation of their hinges and backward relatively to the rotatable member when rotated thereby.

5. In a propelling mechanism, in combination, a rotatable member, means for rotating the same, and a plurality of flexible blades, having their forward portion the heaviest part thereof, hinged to said rotatable member, whereby said blades may yield relatively to the rotatable member when rotated thereby.

6. In a propelling mechanism, in combination, a rotatable member, means for rotating the same, and a plurality of flexible blades, having their forward portion the heaviest part thereof, hinged to said rotatable member, whereby said blades may yield upward relatively to the rotatable member when rotated thereby.

7. In a propelling mechanism, in combination, a rotatable member, means for rotating the same, and a plurality of flexible blades, having their forward portion the heaviest part thereof, hinged to said rotatable member, whereby said blades may yield backward relatively to the rotatable member when rotated thereby.

8. A blade or wing having its forward portion the heaviest part thereof, the additional weight of said forward portion being composed of one or more strips of relatively heavy material.

9. In a helicopter, a pliable blade or wing having its forward portion the heaviest part thereof, the additional weight of said forword portion being composed of one or more strips of relatively heavy material slidable on the blade longitudinally.

10. In a propelling mechanism, a blade or wing adapted to be rolled on a rotatable structure, and controlling means for allowing it to unroll and for rolling it while in orbital revolution, said blade or wing being inclined so as to exert a lift when the circle described by any of its particles is horizontal.

In testimony, that I claim the foregoing, I have hereunto set my hand this tenth day of October, 1907.

ACHILLE ROCHON.

Witnesses:
WM. D. BELL,
JOHN W. STEWARD.